Patented May 12, 1942

2,282,492

UNITED STATES PATENT OFFICE 2,282,492

PROCESS OF ISOLATING ENZYMES

Katsuhei Miyamoto, New York, N. Y., assignor, by mesne assignments, to Frederick Stearns and Company, Detroit, Mich., a corporation of Michigan No Drawing. Application November 1, 1939, Serial No. 302,453

1 Claim. (Cl. 195—66)

The invention relates to the method of isolating enzymes and resulting products.

More particularly the invention is directed to the isolation from Koji solution of a class of enzyme fractions of amylase, and especially the isolation of amyloclastase II, amyloclastase I, maltase and dextrinase. Pursuant to the invention the enzyme fractions may be isolated in successive stages of a continuous process, namely in the order of amyloclastase II, amyloclastase I, maltase and dextrinase, or directly individually isolated.

The products of the invention, to wit, amyloclastase II, amyloclastase I, maltase and dextrinase, are highly useful individually and combinedly in the industries, such as sizing agents and de-sizing agents in textiles, in the preparation of sizing agents in paper manufacture, the manufacture of dextromaltose, the manufacture of starch paste and endless other commercial products. The isolated enzymes, individually and combinedly, are also useful in the manufacture of medicinal products.

This application is a continuation-in-part of my co-pending application Serial No. 206,303, filed May 5, 1938, entitled Process of isolating enzymes.

STAGE I.—*Isolation of amyloclastase II*

This stage may be carried out by utilizing Koji, obtained by the modified procedure of Takamine, as the starting material (Takamine J., Jour. of Pharm., vol. 70, Mar. 1898). The extracted enzyme solution was clarified by means of a super centrifuge clarifier. The clarified solution is filtered through animal charcoal at 40° C. upon a Buchner funnel with suction pump. 700 cc. of the filtered liquid is then concentrated under a vacuum of 29 inches at 45° C. As the concentration proceeds crusty white crystals appear along the sides and bottom of the flask. The condensate is poured into a second round bottom flask, and the crystals of the first flask are rinsed several times with cold water. The rinsing solution is collected and added to the condensate of the second flask. The mixed solution is then concentrated as before with the formation of white crusty crystals. The crystals are treated as before, and added to the first crystals. The rinsing solution is added to the condensate. No crystal formation occurs in the third concentration. The condensate is then treated according to the herein following stage designated II. The collected crystals are washed with cold water upon a Buchner funnel, and finally with alcohol. They are then dried in a desiccator over phosphorus pentoxide. The dried product, amyloclastase II, is a homogeneous snow-white crusty substance. It is soluble with difficulty in cold water but more readily soluble in 1% NaCl solution, and at pH 4.3–4.6.

STAGE II.—*Isolation of amyloclastase I*

The concentrate from Stage I is adjusted with alcohol. It is buffered by $NaH_2PO_4$ to 0.01–0.05 M, and adjusted with phosphoric acid to a pH of about 5.3–5.6 at 28° C. It is further treated with NaCl to make 0.5–1.0% concentration. A slightly yellowish precipitate settles at the bottom of the container. The precipitate is separated immediately by means of a centrifuge. The alcoholic solution is treated according to Stage III, following. The precipitate is then dissolved in a minimum amount of water, and dialyzed over night. The dialyzed solution is re-precipitated by means of 50–55% alcohol at pH 5.3–5.6. It is then filtered, washed and dried as in the case of Stage I. The dried substance, amyloclastase I, is a slightly yellowish powder, and easily soluble in 1% sodium chloride at pH 5.3–5.6.

STAGE III.—*Isolation of maltase*

The alcoholic solution from Stage II is further treated with alcohol to make 75–80% strength by volume and adjusted to a pH 4.3–4.6. Upon standing, fluffy snow-white needles, often reaching 1. to 1.5 inches long separate out. The substance is then purified and dried according to Stage II, and the alcoholic solution is treated in accordance with Stage IV, following. The dried product consists of white fluffy needles, maltase, readily soluble in water. This enzyme showed the following reactions.

(a) It was precipitated by alcohol and ether, but did not coagulate.

(b) In Biuret reaction it gave slightly reddish coloration, suggesting that peptone linkage might be present.

(c) It failed to give Heller's nitric acid test.

(d) Tannic acid, phosphotungstic acid and copper acetate precipitated the enzyme.

(e) With Millon's reagent, it produced a voluminous precipitate, but did not turn red upon heating.

(f) In Ninhydrin reaction, it gave a burgundy red coloration indicating the presence of histidine radicals.

(g) Freshly prepared crystalline maltase imparted a strong acid odor, and its solution has shown definite acidic properties.

Stage IV.—*Isolation of dextrinase*

The alcoholic solution from Stage III is treated with water to adjust its alcoholic strength to 55–60% by volume at 28° C., and adjusted to a pH 4.8–5.2. It is then allowed to stand over night, i. e., about 12 hours. A yellowish white flocculent precipitate settles at the bottom of the container. The clear part of the alcoholic solution is poured off, and the decanted precipitate is filtered, washed, dialyzed, and dried according to Stage II. When dried, the dextrinase is a yellowish white powder, and readily soluble in water.

Direct isolation of amyloclastase I from Koji solution

Utilizing a Koji solution, obtained by the modified procedure of Takamine, as the starting material, the Koji solution is clarified by means of filtration through charcoal or diatomaceous earth; the filtrate is then buffered with $NaH_2PO_4$ to 0.01–0.05 M and the pH adjusted to 5.3–5.6 at a temperature of 28° C.; the solution is then treated with NaCl to normal concentration; amyloclastase I is then precipitated by alcohol. A yellowish precipitate is obtained and may be completely separated by means of a centifuge or filtration. The precipitate is then dissolved in a minimum amount of water and is dialyzed for about twelve (12) hours. The dialysate is reprecipitated by alcohol at pH 5.3–5.6. The precipitate, amyloclastase I, is recovered by means of filtration or centrifuge, dried in the same manner as in stage I.

Direct isolation of maltase

Utilizing a Koji solution, obtained by the modified procedure of Takamine, as the starting material, the Koji solution is acidulated and filtered through charcoal for clarification. The solution is then filtered through diatomaceous earth for the purpose of having the diatomaceous earth adsorb the maltase. The diatomaceous earth is then washed with a neutral solution for the purpose of recovering the maltase. The solution is adjusted to a pH of 4.3–4.6 and the maltase is crystallized out of solution by the addition of alcohol. Upon standing, fluffy snow white needles settle to the bottom of the container. These vary in length from 1 to 1¼ inches. The substance is then purified by re-crystallization and dried. This enzyme is readily soluble in water.

The direct isolation of dextrinase

Utilizing a Koji solution, obtained by the modified procedure of Takamine, as the starting material, the Koji solution is acidulated and filtered through a relatively larger amount of charcoal than is used in the isolation of maltase, the solution is then filtered through diatomaceous earth. The pH is adjusted to 4.8–5.2 and the enzyme is precipitated by alcohol at 28° C. The solution is allowed to stand for about twelve hours and a yellowish white flocculent precipitate settles on the bottom of the container. Upon complete precipitation the alcohol is decanted off, and the precipitate is recovered by filtration; it is then washed and dialyzed, recovered and dried.

Identification of amyloclastase I and II (a) Fifty grams of soluble commercial potato starch were stirred into 200 cc. of water; this milky liquid was immediately stirred into 800 cc. of boiling water. The heat was adjusted to boiling, and boiling was continued for two minutes. When cooled to room temperature, the starch solution was buffered with $NaH_2PO_4$ to 0.01 M concentration, and adjusted to pH 5.3 with $H_3PO_4$. The starch solution thus obtained was divided into four parts, of 250 cc. each.

Into the first flash 0.2 gm. of amyloclastase I was added; into the second 0.2 gm. of amyloclastase II. Into the third, a mixture of 0.1 gm. of amyloclastase I and 0.1 gm. of amyloclastase II were suspended; the fourth flask was employed as a control. These flasks were incubated at 40° C. until their end point was reached. The end point of the reaction products was determined on the basis of the author's previous report. When a few drops of the reaction product were spread on a white porcelain dish and a drop of I-KI solution was added, the major part of the ring was found to possess a deep purple coloration surrounded by a thin strip of blue. The purple coloration indicated the presence of amylopectin, and the blue, the presence of amylose. This characteristic end point was demonstrated by the reaction products in the first, second and third flasks, but not in the fourth—the control flask. The rate of the reactions, however, differed, being 23, 31 and 15 minutes respectively.

These reaction products, in their respective flasks, were again incubated at 40° C. in the presence of tutuol as an antiseptic. They were then examined by means of I-KI (iodine)-potassium iodide ring test after 6, 12, 24, 48 and 72 hours. No further reaction had taken place, indicating that they were specific depolymerizing enzymes acting on starch.

(b) A 1,000 cc. 5 percent starch solution buffered with $NaH_2PO_4$ was prepared similarly as in Stage I. In this instance it was controlled at pH 4.5 with $H_3PO_4$. The starch solution thus obtained was divided into four parts and incubated at 40° C. as before. In this stage the time of reaction of amyloclastase I and amyloclastase II was almost reversed, i. e., 29 minutes and 21 minutes respectively, while their mixture was nearly constant—15.5 minutes.

Comparative stages have shown that amyloclastase I was favored at pH 5.3; that of amyloclastase at pH 4.5, while their mixture was effective between pH 4.5 and 5.3 under the above conditions. As their respective pH their solubilities were accelerated, and it has been found that the mixture of these enzymes were indispensable during the course of the depolymerization of starch.

Identification of dextrinase 750 cc. of a 5 percent solution of starch was prepared with commercial soluble potato starch. It was buffered with $NaH_2PO_4$ to 0.01 concentration and adjusted to pH 5.3 with phosphoric acid. The resulting starch solution was divided into three parts of 250 cc. each, in 350 cc. Erlenmeyer flasks. To the first and the second flasks, 0.15 gm. each of amyloclastase I and amyloclastase II and 0.2 gm. of dextrinase, was added; the third flask was employed as a control. These flasks were incubated at 40° C. until breaks occurred or the viscosity of the amylopectin disappeared entirely. This point in the reaction products were determined by means of I-KI ring test upon a white porcelain dish. The center of the ring was of a reddish-brown color surrounded by blue coloration, showing the presence of maltose and alpha-amylodextrin respectively. As soon as this test was positive, the reaction products in the first flask were subjected to Stage II, to separate alpha-amylodextrin from maltose, and those in the second flask were given additional incubation, and the progress of the reaction examined by means of I-KI ring test. At the end of the reaction, it exhibited heterogeneous colorations. The center of the ring took on a reddish-brown color, then blue and pink. The extreme outer ring showed a tendency to discoloration. These colorations indicated the presence of maltose, alpha-amylodextrin, erythrodextrin and achrodextrin. The incubation of the second flask of reaction products was continued and examined by means of the above ring test after 2, 6, 12, 24, 48 and 72 hours. No further change was observed—indicating that this was the last step of the intermediate stage of the hydrolysis of starch by the mixture of enzymes, and demonstrating the specific action of dextrinase as well as amyloclastase I and amyloclastase II on starch.

When the resultant reaction product (obtained as above) was diluted with water, it exhibited a pure purple coloration, showing this to be the phase of the hydrolysis of starch upon which the Wöhlgemuth scale depends.

The rate of reaction of the enzyme mixture acting on starch was dependent upon the quantities of the respective enzymes employed. In one case the mixture of enzymes gave a value on the Wöhlgemuth scale $D_{24}^{40°}$ hours—660,000, and in other cases $D_{24}^{40°}$ hours—1,000,000.

*Identification of maltase*

To a solution comprised of a mixture of alpha-amylodextrin and maltose, prepared in accordance with the procedure previously described, a minute amount of maltase was added. The solution in this instance was adjusted to pH 4.5, and the temperature was controlled at 50° C. After a lapse of five minutes the reaction products were examined by means of I-KI solution, using a porcelain dish for a spot test. The center of the ring was occupied by a brownish color, indicating the presence of a mixture of erythrodextrin and maltose. The brownish coloration was surrounded by a deep blue, showing there was still present alpha-amylodextrin at this step. This was again surrounded by a third layer, having a pinkish blue, signifying the presence of a considerable quantity of erythrodextrin. The extreme outer layer was without color—an indication of the presence of a mixture of achrodextrin and maltose. It thus becomes evident that a most complicated heterogeneous reaction had taken place at this stage of the hydrolyzation of starch by an amylase. Within a few minutes, the reaction products were re-examined whereupon the previously observed position of the brownish and blue ring was found to be reversed.

In other words, the blue color now occupied the center position and was surrounded by the brownish color; however, the position of the outer rings remained unaltered. Upon standing a few minutes all colors disappeared, and the spot test became colorless. The disappearance of the pink and blue coloration demonstrates the absence of alpha-amylodextrin and erythrodextrin, and indicates that the reaction products consisted of a mixture of maltose and achrodextrin.

It is interesting to note that no formation of glucose was noticeable at this time, neither by Barfoed's nor by the phenylhydrozine tests, nor was any color produced by I-KI solution—thereby proving this to be the achromatic point of hydrolyzed starch.

Incubation at 40° C. of the reaction products was subsequently effected. Glucose was detected in one sample after 8 hours, and in other after 12, 16 and 24 hours. The velocity of the formation of glucose was thus shown to be dependent upon the amount of maltase added.

Whereas I have described my invention by reference to specific forms thereof, it will be understood that many changes and modifications may be made without departing from the spirit of the invention.

I claim:

The process which comprises: (1) vacuum concentrating clarified Koji solution, separately recovering the crystal product and the condensate; (2) treating the said condensate with alcohol, adjusting the pH to between about 5.3–5.6, then treating with sodium chloride and recovering the so-formed precipitate from the alcoholic solution; (3) adding alcohol to the alcoholic solution from Stage 2 to make a solution of between 75 and 80 percent strength by volume, adjusting to a pH of 4.3–4.6, and recovering from the alcoholic solution the crystals formed upon standing; and, (4) adding water to the alcoholic solution from Stage 3 to make its alcoholic strength to between 55 and 60 per cent by volume, adjusting the solution to a pH of 4.8–5.2, and recovering the precipitate formed upon standing.

KATSUHEI MIYAMOTO.